May 2, 1961 M. H. SMITH 2,982,249
DOG MUZZLE
Filed May 20, 1959
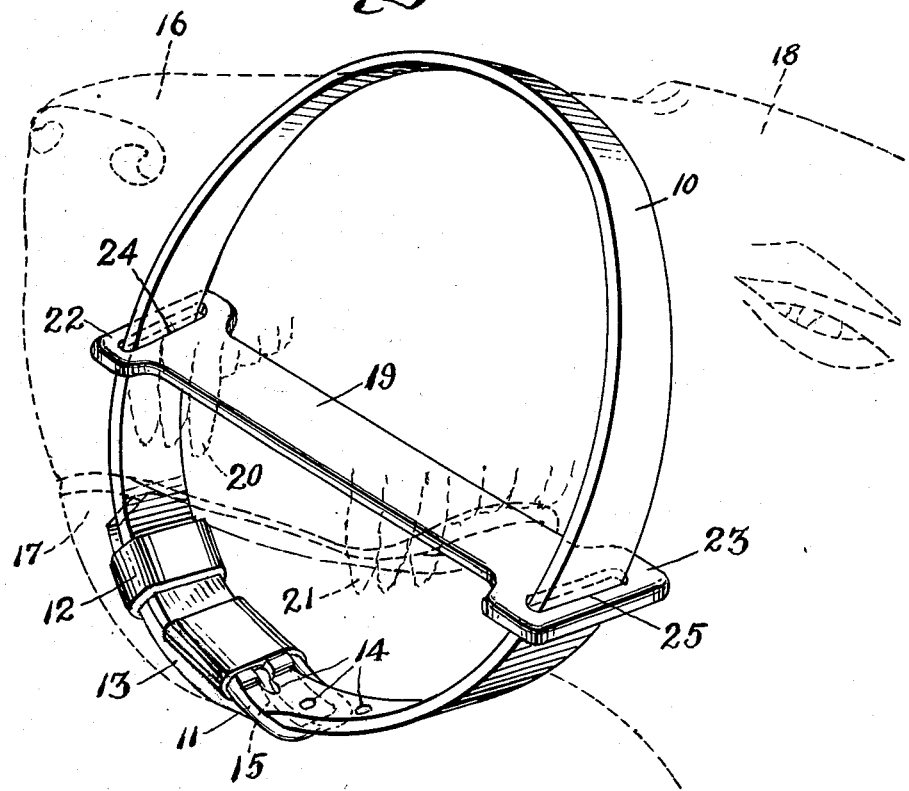
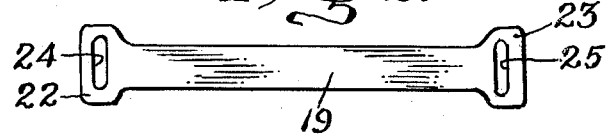
INVENTOR
Merrill H. Smith

United States Patent Office 2,982,249
Patented May 2, 1961

2,982,249

DOG MUZZLE

Merrill H. Smith, 470 Forrest Ave., Athens, Tenn.

Filed May 20, 1959, Ser. No. 814,465

1 Claim. (Cl. 119—129)

This invention relates to a dog muzzle.

It is the principal object of the present invention to provide a dog muzzle comprising simply a strap adapted to be fastened about the nose and lower jaw of the dog and a bit or cross bar extending about the sides of the strap across the mouth and locked from disengagement upon the mouth by the fang teeth.

It is another object of the invention to provide a dog muzzle which can be inserted and fastened about the nose and jaw of the dog and which will be impossible to be dislodged therefrom yet comfortably restrain the dog from barking, biting, eating carrion or poisoned food.

It is still another object of the invention to provide a dog muzzle which can be manufactured and sold at a much lower cost than the present dog muzzles and yet at the same time be fully as effective in use.

It is a further object of the present invention to provide a dog muzzle which is adjustable quickly and easily to the different sizes of dog.

It is a still further object of the invention to provide a dog muzzle which is more comfortable to the dog than the present muzzles and neater in appearance.

For further objects and for a better understanding of the invention, reference may be had to the following detailed description taken in connection with the accompanying drawing, in which:

Figure 1 is a substantially full size perspective view of the dog muzzle embodying the features of the present invention with illustration made as to the manner in which the same is fastened to the nose and underjaw of the dog, and Fig. 2 is a plan view of the cross bar.

Referring now to the drawing, a dog muzzle embodying the features of the present invention comprises generally a strap 10 of leather or plastic having a buckle 11 in one end and a sleeve 12 spaced therefrom and adapted to receive free end 13 of the strap. The free end of the strap has a plurality of holes 14 through which a pin 15 can extend so that the strap can thereby be adapted to different size noses 16 and lower jaws 17 of a dog 18. The strap is placed thereover and so that a cross bar 19 secured to the sides of the strap is placed behind the fang teeth 20 and 21 to the sides of the dog's head so that by keeping the lower jaw locked upon the nose the strap is held from displacement from between the dog's jaws by the fang teeth 20. While the strap 10 is made of either leather or plastic the cross bar or bit is preferably made of a more solid piece of pliable plastic. The ends of this piece 19 provided with enlarged ends 22 and 23 respectively having elongated slots 24 and 25 through which the strap is extended. In this manner the cross bar 19 is held by the sides of the strap against fore and aft tilting and flush with the rows of teeth of the dog. The cross bar 19 is sufficiently wide and rigid yet bendable flatwise to permit easy closing of the jaws and to be comfortable for the dog.

The cross bar or bit 19 with its apertured ends is a one piece of flexible and yet extremely durable plastic material. It is wide and flat and has a thickness of about one quarter its width.

The ends of the cross bar are shaped to set at an angle of ninety degrees to the direction of the bite. The over all length of the cross bar 19 for Dobermans, Shepherds, Collies and German Police dogs is approximately three inches, of the width three quarters of an inch while the thickness is one quarter of an inch. The slots 24 and 25 are such as to receive a leather strap 10 that is one eighth of an inch thick and five eights of an inch wide. The strap 10 works freely in the openings 24 and 25 of the cross bar 19 and encircles the entire nose and lower jaw of the dog and may be buckled together at either side of the jaw or anywhere in the circle at a desired point upon the nose or lower jaw of the dog. The cross bar has nothing in common with a harness bit as it has an entirely different purpose. The cross bar provides an absolute anchorage in the dog's mouth and maintains the leather strap 10 in the correct position to prevent the cross bar from being dislodged from the mouth since the strap prevents the mouth from being opened to any extent. The arrangement is such that no discomfort to the teeth or flesh is caused to the dog. The dog will accordingly be restrained from barking, biting, or being a threat to people or other animals and eating or drinking carrion or poisoned food or water.

It should be apparent that there has been provided a dog muzzle which consists merely of two parts, the cross bar or bit and the leather flexible strap. It will also be apparent that it can be manufactured and marketed at a much lower cost than other types of muzzles. It will also be apparent that it can be quickly and easily put on, causes no discomfort and cannot come off or be worked loose by the dog.

It shall be understood that the muzzle can be made with different length bits or cross bars depending upon the size of the dog and that the strap can be made of different lengths and with different numbers of adjusting holes for the buckle. It should also be apparent that the muzzle is not restricted to use with dogs alone but may be used on other species of animals possessing fang teeth. The strap will lie over the nose and under the jaw about half way between the nose and the eyes of the dog. It is obvious that various immaterial modifications may be made in this invention without departing from the spirit thereof and that the same is not limited to the exact form of construction, arrangement and combination of parts herein shown and described or uses mentioned but shall cover the invention as defined by the appended claim.

What is claimed is:

A dog muzzle comprising a flexible strap having ends adapted to be adjustably connected together about the nose and lower jaw of a dog, a cross bar slidably secured at each end to the flexible strap for unrestricted adjustment thereon and adapted to be located in the mouth of the dog in rear of the fang teeth such that when the strap is tightened the fang teeth prevent the disengagement of the muzzle from the mouth, said cross bar being flat and having a width of approximately four times the thickness and having end portions with elongated transversely extending slots through which the flexible strap extends, said cross bar being less flexible than the strap but of durable material.

References Cited in the file of this patent

UNITED STATES PATENTS

| | | |
|---|---|---|
| 953,437 | Rexicker | Mar. 29, 1910 |
| 2,728,326 | Andrew | Dec. 27, 1955 |